US006321273B1

United States Patent
Schofield

(10) Patent No.: US 6,321,273 B1
(45) Date of Patent: *Nov. 20, 2001

(54) METHOD AND APPARATUS USING PARAMETERIZED VECTORS FOR CONVERTING INTERFACE DEFINITION LANGUAGE-DEFINED DATA STRUCTURES INTO A TRANSPORT AND PLATFORM INDEPENDENT FORMAT

(75) Inventor: Andrew Schofield, Cham (CA)

(73) Assignee: 724 Solutions, Inc., Toronto (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/678,681

(22) Filed: Jul. 11, 1996

(51) Int. Cl.⁷ .................................................... G06F 9/54
(52) U.S. Cl. .......................... 709/315; 709/203; 709/230
(58) Field of Search .................................... 395/680–685; 709/100–105, 310–332, 200–253

(56) References Cited

U.S. PATENT DOCUMENTS

| | | | |
|---|---|---|---|
| 5,247,676 | * 9/1993 | Ozur et al. | 709/328 |
| 5,613,148 | * 3/1997 | Bezviner et al. | 709/203 |
| 5,778,228 | * 7/1998 | Wei | 709/328 |
| 5,787,281 | * 7/1998 | Schreiber et al. | 709/328 |
| 5,926,636 | * 7/1999 | Lam et al. | 709/313 |

OTHER PUBLICATIONS

OMGi Object Collections Service, OMG TC Document Oct. 12, 1995 Version 1.0.0.*

Weiss et al; Distributed Compuling: JAVA, CORBA & DCF http://pscosf.peru.edu/~mccaslin/java/covba.htmal pp. 1–22, Feb. 1996.*

OSF; Remote Procedure Call in a distributed Computing Environment; pp. 1–8, 1990.*

The Common Object Request Broker Architecture and Specification, Revision 2.0, Chap 1–4, Jul. 1995.*

* cited by examiner

Primary Examiner—St. John Courtenay, III
(74) Attorney, Agent, or Firm—Thompson & Knight LLP

(57) ABSTRACT

The present invention is a method and apparatus for processing an object call between a client computer system and a server computer system. Using the method of the present invention, an object call begins on the client system with the construction of a parameterized vector. The parameterized vector has one entry for each parameter of the object call. The parameterized vector is then initialized so that each entry in the parameterized vector points to one of the parameters of the object call. The entries within the parameterized vector are arranged in a canonical order. Once the parameterized vector has been completed, the object call is transmitted from the client to the server. The server receives the object call and allocates a parameter area. The parameter area has one entry for each parameter of the object call. The parameter area is then initialized so that each entry within the parameter area contains an object pointed to by one of the entries in the parameterized vector. The entries in the parameter area are arranged in parameter order for the server system. The object call may then proceed on the server system with the parameter area acting as the parameters for the object call.

11 Claims, 4 Drawing Sheets

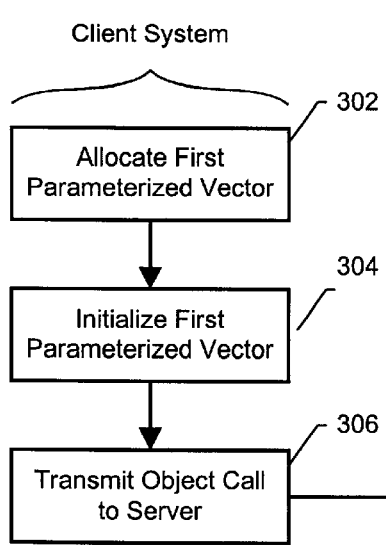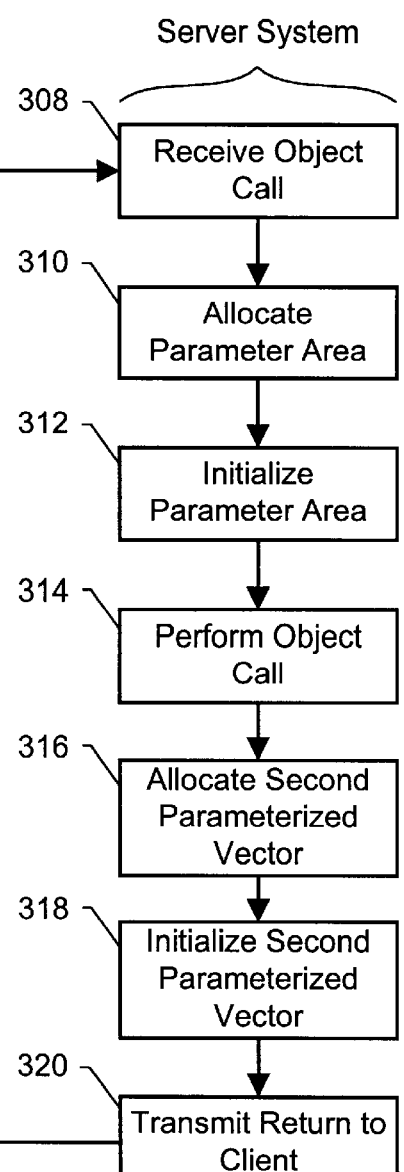

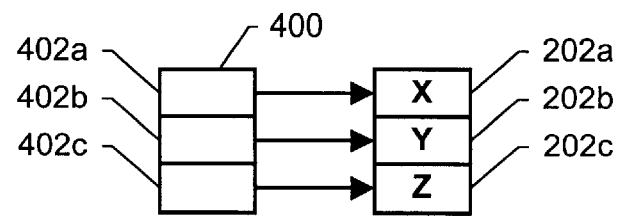
FIG. 4
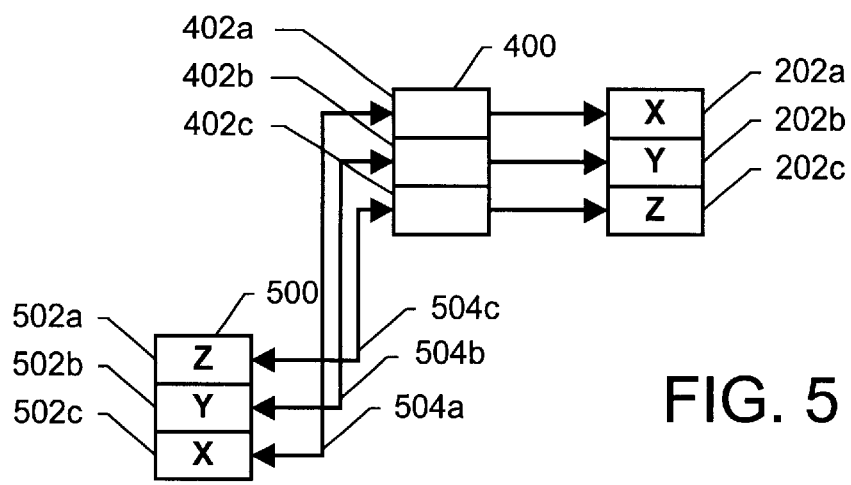
FIG. 5
FIG. 6
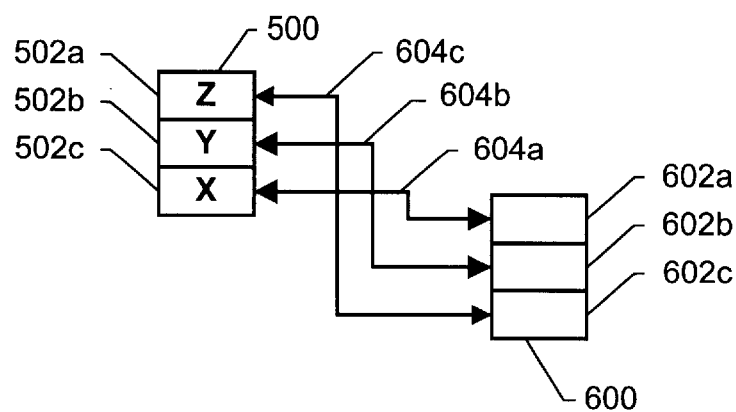

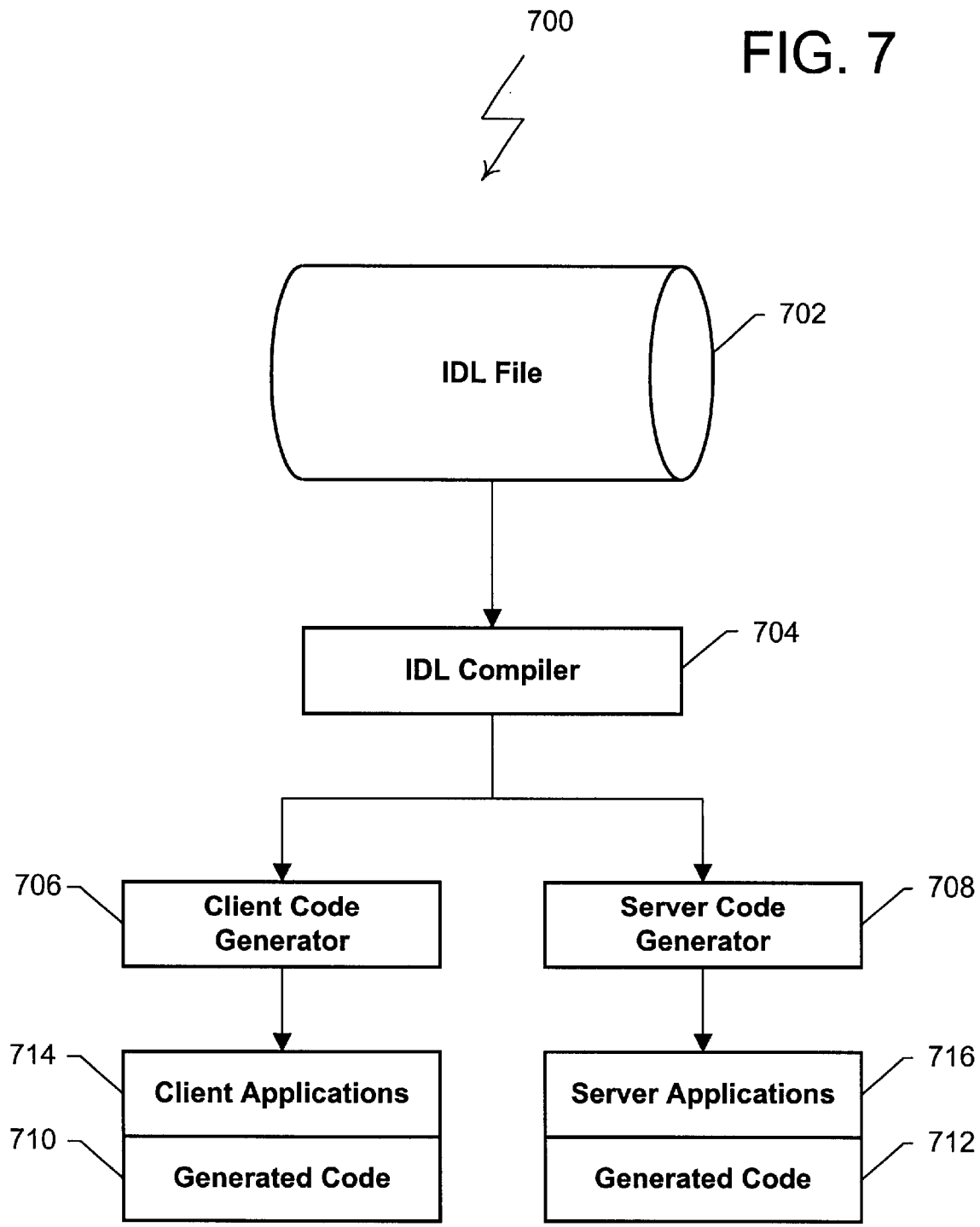

METHOD AND APPARATUS USING PARAMETERIZED VECTORS FOR CONVERTING INTERFACE DEFINITION LANGUAGE-DEFINED DATA STRUCTURES INTO A TRANSPORT AND PLATFORM INDEPENDENT FORMAT

RELATED APPLICATIONS

The following related U.S. applications are hereby incorporated by reference: U.S. application Ser. No. 08/680,270 entitled "Method and Apparatus for Describing an Interface Definition Language-Defined Interface, Operation, and Data Type" by A. Schofield, filed Jul. 11, 1996; U.S. application Ser. No. 08/678,298 entitled "Data Structure Representing An Interface Definition Language Source File" by A. Schofield, filed Jul. 11, 1996; now U.S. Pat. No. 5,943,367 U.S. application Ser. No. 08/680,203 entitled "Method And Apparatus For Transporting Interface Definition Language-Defined Data Structures Between Heterogeneous Systems" by A. Schofield filed Jul. 11, 1996; U.S. application Ser. No. 08/678,295 entitled "Method and Apparatus for Performing Distributed Object Calls" by A. Schofield filed Jul. 11, 1996; U.S. application Ser. No. 08/680,202 entitled "Method and Apparatus for Asynchronously Calling and Implementing Objects" by A. Schofield, filed Jul. 11, 1996; U.S. application Ser. No. 08/680,266 entitled "Method and Apparatus for Performing Distributed Object Calls using Proxies and Memory Allocation" by A. Schofield filed Jul. 11, 1996.

FIELD OF THE INVENTION

The present invention relates to the execution of remote procedure calls on networked computer systems. More particularly, the present invention is a method and apparatus for ensuring correct parameter ordering when a remote procedure call is made between heterogeneous platforms.

BACKGROUND OF THE INVENTION

The networking of computers has, in recent years, become increasingly common. For example, Automated Teller Machines, or ATMs, represent one type of commonly used computer network. Computer networks are also used to schedule air travel reservations and to link computers within offices and factories. Recently, with the rise of the world wide web, computer networking has gained an acceptance and notoriety which would have been difficult to imagine, even in the recent past.

Historically, computers have been networked to perform specialized tasks. For example, ATM networks were constructed to handle the day-to-day financial transactions of bank customers. Other computer networks were constructed to help companies track inventory or employee records. These types of specialized computer networks were efficiently implemented using a simple client/server model. In this model, a number of client processes, usually running on remote computers and terminals, requested services and information from one or more server processes. The server processes, which often executed on a centralized mainframe, would process the requests from the client processes and provide the required information and services.

Simple client/server computer networks have proven to be well suited to the performance of specialized and well defined tasks. Increasingly, however, specialized computer networks are being combined into larger, heterogeneous networks which offer a range of different services. For example, there is obvious utility in having a single computer network within a bank which coordinates the actions of not only the bank's ATMs, but also the computers that process the bank's financial records. In fact, it is easy to see that networking all of a bank's computers might provide the bank with certain advantages, and that linking the banks network to a larger network, such as the internet, could provide the bank's customers with the ability to perform some transactions from their home computers.

Unfortunately, when compared to simple client/server networks, heterogeneous computer networks have been found to be much more difficult to design and implement. This is due, of course, to the variety of computer types, operating system types and communication protocols which must be supported. It is also due, in part, to the fact that, in heterogeneous networks, there is no single centralized server. Instead, many servers provide different services and servers are often clients of other servers. As a result, when a new service or protocol is added to a heterogeneous network, it often has to be integrated into many different systems.

Distributed object computing is a method for reducing the complexity involved in the design, implementation and maintenance of computer networks. In general terms, distributed object computing is an application of concepts developed in object oriented programming to computer networking. Object-oriented programming, or "OOP", is based upon a model where programs are written in terms of "objects" which are often abstracted from objects in the real world. Objects are collections of data elements, which may be "private" or "public," and functions, which may also be "private" or "public." In object oriented programming, groups of related objects are referred to as an object "class."

One of the primary goals of object-oriented programming is known as "encapsulation", or "data hiding." Generally, encapsulation is the ability of an object to control access to its non-public data and functions. Specifically, direct access to an object's private data and functions is prohibited. Instead, access to private data and functions is provided indirectly through the object's public functions. As a result, an object may perform a particular task without revealing any details of how the task is performed. For example, in an object oriented programming language which does not support complex numbers, it would be possible to define a complex number object. The complex number object would be defined to include a real data element and an imaginary data element. The object could also be defined to have public functions for addition, subtraction and printing of imaginary numbers. Once the object was defined, instances of the object could be added, subtracted and printed without any knowledge of the inner workings of the objects involved.

Distributed object computing applies the paradigm of object oriented programming to computer networking. In a distributed object system, a common description language is used to define classes of objects available within the computer network. A descriptive language is, in some ways, similar to a programming language. Descriptive languages can only be used, however, to define objects and not to actually implement the algorithms associated with those objects. Each object corresponds to a service provided by one or more servers within the network. Clients obtain access to these services by making a request (or "object call") using one or more of the defined objects. The server which implements the involved objects receives the request and, if possible, carries out the requested operation. Importantly, through encapsulation, the client does not need to know how the request will be carried out by the server.

The Interface Definition Language (IDL), as defined by the Object Management Group (OMG), is an example of an object oriented description language which is specifically directed at the construction and maintenance of computer networks. Using IDL, a programmer defines objects which correspond to services available on the computer network. These objects are included in an IDL source file (or "translation unit"). The IDL source file is processed by an IDL compiler which produces, as output, source files written in a high-level programming language, such as C or COBOL. The IDL output files contain definitions, stubs, and skeletons which correspond to each object originally defined in the IDL source file. The IDL output files are then separately compiled for the client system and the server systems. When compiled for the client systems, the stubs included in the IDL output files become object calls. The client may then request the defined service by calling the stub procedure. When compiled for the server, the skeleton procedures map the defined request to the system of the server. The server may then process the client's object calls by executing the skeleton procedure.

When an object call is made, a list of parameters (often consisting of references to objects), must be transported between client and server. Such object calls may occur between identical systems, but are increasingly likely to be made across heterogeneous platforms using different operating systems, programming languages, and compilers. As a result, there is a possibility that a parameter list generated on a client will be ordered incorrectly for use on the server. For example, most programming languages utilize a stack architecture. Before a procedure is called, each parameter to the procedure to be called is placed on the stack. This works because the calling procedure and the called procedure agree on the order in which parameters will be placed on the stack. If however, the calling procedure ordered the parameters first to last and the called procedure expected that the parameters would be ordered last to first, there would almost undoubtedly be problems. In highly heterogeneous environments, this type of inconsistency, as well as other types of inconsistencies, is commonplace.

One solution to this problem is to provide clients and servers with detailed nowledge of each other. However, with this approach a primary goal of object-oriented computing—encapsulation—is lost. In addition, both the client and the server applications must write detailed alignment functions to ensure compatibility during object calls. This extra coding work makes distributed object computing less efficient.

SUMMARY OF THE INVENTION

The present invention is a method and apparatus for processing an object call between a client computer system and a server computer system. For the implementation of the present invention, a first parameterized vector is associated with each object call. Similarly, a second parameterized vector is associated with every return of an object call. Each parameterized vector is a data structure, such as an array, which includes one entry for each parameter associated with the object call.

Just prior to making the object call, the client system initializes the first parameterized vector so that each entry in the first parameterized vector contains a pointer to one of the parameters associated with the object call. Within the first parameterized vector, the entries are arranged in a predetermined canonical order. Generally, any predetermined ordering may be chosen as the canonical ordering. For the sake of simplicity, however, it is convenient to define the canonical ordering to be the order in which the parameters appear in the invocation of the object call. For example, for an object call of the form "add (x, y, z)", the preferred canonical ordering would be x, followed by y, followed by z. Importantly, the canonical order is constant between all client and server systems which utilize the method of the present invention. Therefore, the canonical ordering is independent of system dependencies, such as stack architecture, or the order in which parameters are evaluated on a particular system.

After construction and initialization of the first parameterized vector, the object call is transmitted from the client to the server system. Transmission of the object call includes transmission of the first parameterized vector. Once the object call and first parameterized vector are received by the server system, the server allocates a parameter area for the object call. The parameter area is a memory region large enough to contain all of the parameters associated with the object call. Once established, the parameter area is initialized so that each entry in the parameter area contains an object pointed to by one of the entries in the first parameterized vector. In other words, the parameter area is initialized to contain the parameters for the object call. During initialization of the parameter area, the entries in the parameter area are arranged to be in parameter order for the server system (i.e. the order in which parameters are stored in memory for object calls on the server system). This order may, of course, differ from the canonical order of the first parameterized vector. After creation of the parameter area, the server may continue with execution of the object call.

At the completion of the object call, a second parameterized vector is allocated, this time by the server. The second parameterized vector is initialized so that each entry points at one of the entries in the parameter area (i.e. each entry in the second parameterized vector points at one of the object call's parameters). The entries within the second parameterized vector are, once again, arranged in canonical order. As the object call returns, the second parameterized vector is transmitted by the server to the client.

Upon receiving the return of the object call, the client system uses the second parameterized vector to update each parameter which it had originally passed to the object call. In more detail, as result of the object call, the client system is placed in possession of two copies of each parameter passed to the object call. The first of these copies are the original parameters passed to the object call. These parameters are pointed to by the entries in the first parameterized vector. The second set of parameters are the parameters transmitted by the server to the client during the object call return. These parameters are pointed to by the entries in the second parameterized vector. Of course, the object call may have altered some, or all of its parameters. As a result, the original parameters must be updated by overwriting each original parameter with the corresponding parameter returned by the object call.

The object call methodology described above may be implemented using a number of differing techniques. For example, the object call methodology could be implemented using traditional programming techniques such as hand coding. Preferably, however, the object call methodology is at least partially automated as part of an IDL compilation process. In more detail, for the present invention, an interface is described in an IDL source file. The interface, which is described in terms of objects, is translated into high-level language definitions for a client stub procedure and a server skeleton procedure.

The stub procedure, which executes on the client system, begins by allocating and initializing the first parameterized vector. The stub procedure then transmits the object call to the server, and generally, waits for the object call return. When the object call returns, the stub procedure updates each parameter with the parameters returned from the server system.

The skeleton procedure, which executes on the client system, begins by allocating and initializing the parameter area. The stub procedure then calls the object call on the server system. At the completion of the call, the skeleton procedure allocates and initializes the second parameterized vector. After initialization of the second parameterized vector, the skeleton procedure transmits the return to the client.

Operationally, the stub and skeleton procedures functions as dummy entry points for use by the client and server. When the client system wishes to make a specific object call, it simply calls the stub procedure associated with that object. Similarly, when the server system receives a request for a specific object call, it simply calls the skeleton procedure associated with that object.

In accordance with the purposes of the present invention, as broadly described hereby, the invention is a method of processing an object call between a client system and a server system, the method comprising the following steps executed within the client system: allocating a first parameterized vector for the object call, the first parameterized vector having one entry for each parameter required by the object call, generating a mapping which associates each entry in the first parameterized vector with a parameter of the object call, the mapping being generated so that the entries within the first parameterized vector are arranged in a canonical order, applying the mapping to initialize the first parameterized vector so that each entry in the first parameterized vector contains a pointer to the associated parameter of the object call, and transmitting the object call to the server system.

In further accordance with the purpose of the present invention, as broadly described hereby, the invention is a method for creating an object call interface between a client computer system and a server computer system using a first parameterized vector, the method comprising the steps of: creating an IDL source file describing the object to be called, using the IDL source file to produce source code for a client stub procedure, the source code of the client stub procedure including code to allocate and initialize a first parameterized vector to that each entry in the first parameterized vector points to one parameter required for the object call, the entries in the first parameterized vector being arranged in a canonical order, and using the IDL source file to produce source code for a server skeleton procedure, the source code of the server skeleton procedure including code to initialize a parameter area so that each entry in the parameter area contains an object pointed to by one entry in the first parameterized vector, the entries in the parameter area being arranged in parameter order for the server computer system.

Advantages of the present invention will become more fully apparent when the following detailed descriptions of the invention are read in conjunction with the accompanying drawings.

BRIEF DESCRIPTION OF THE DRAWINGS

The invention will now be described with reference to the accompanying drawings, wherein:

FIG. 2 is a diagram of a parameter list.

FIG. 3 is a flowchart of the method for performing an object call according to the present invention.

FIG. 4 is a diagram of a parameterized vector shown in association with a parameter list.

FIG. 5 is a diagram of the parameterized vector and parameter list of FIG. 4, now shown with a parameter area.

FIG. 6 is a diagram of a second parameterized vector shown in association with the parameter area of FIG. 5.

FIG. 7 is a block diagram of the IDL compilation system of the present invention.

DETAILED DESCRIPTION OF THE PREFERRED EMBODIMENTS

Figure 1:
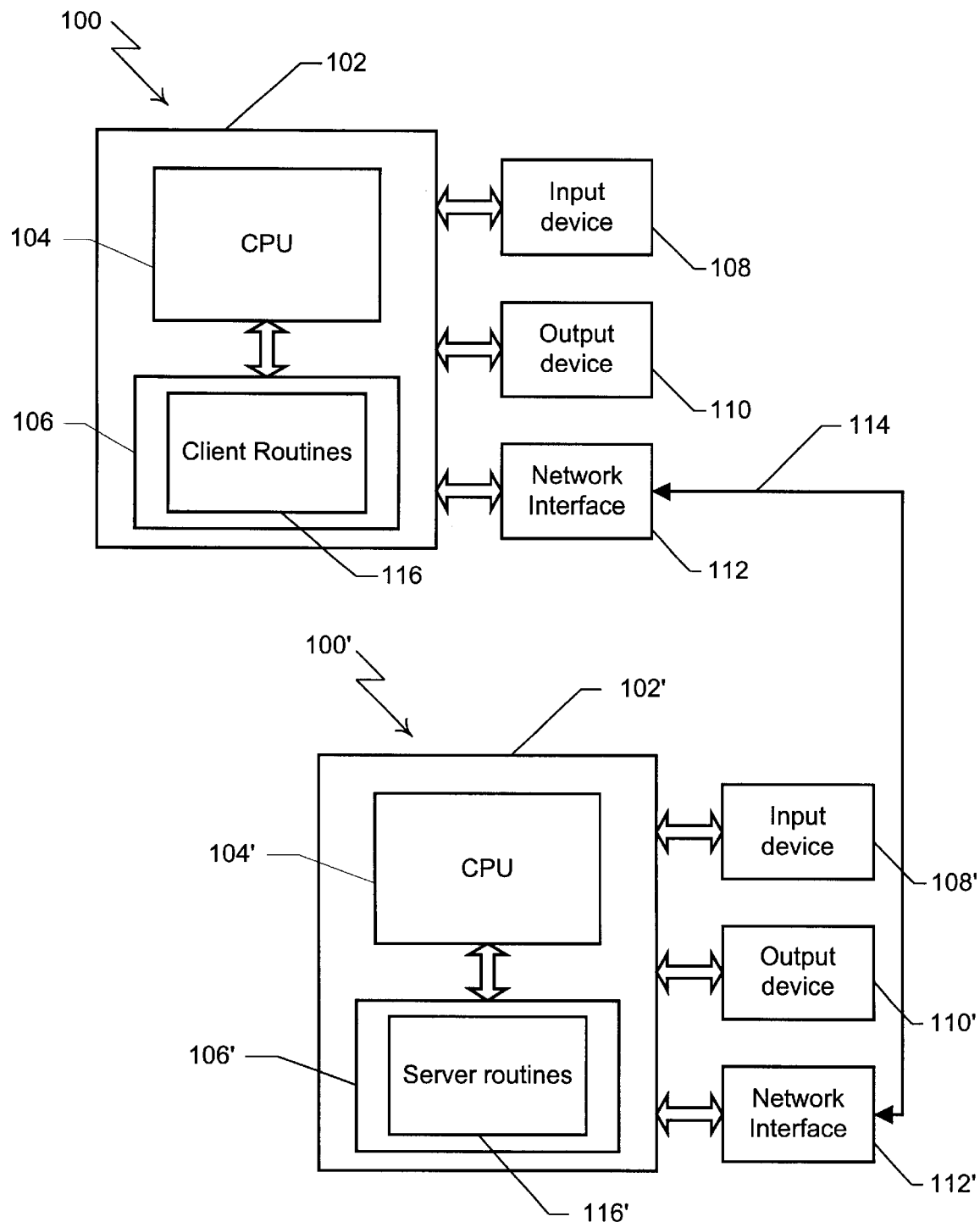
FIG. 1 is a block diagram of a data processing system in accordance with a preferred embodiment of the present invention.

Reference will now be made in detail to the preferred embodiments of the invention, examples of which are illustrated in the accompanying drawings. Wherever possible, the same reference numbers will be used throughout the drawings to refer to the same or like parts.

The present invention is a method and apparatus for processing an object call between a client computer system and a server computer system. In FIG. 1, a data processing system 100 is shown as a representative environment for the present invention. Structurally, the data processing system 100 includes a host computer 102 which, in turn, includes a central processing unit, or CPU, 104 and a memory 106. An input device 108 and an output device 110 are connected to the host computer 102 and represent a wide range of varying I/O devices such as keyboards, modems, disk drives, printers and displays. FIG. 1 also shows that data processing system 100 includes a network interface 112 and that network interface 112 is connected, in turn to a network 114.

A second data processing system 100' is also connected to the network 114. As shown second data processing system 100' is substantially similar to data processing system. The two systems differ, however, with respect to the contents of memory 106 and 106'. More specifically, FIG. 1 shows that client routines 116 are loaded into memory 106 of system 100. This identifies system 100 as a network client. On the other hand, server routines 116' are loaded into memory 106' of system 100'. This identifies system 100 as a network server. For the sake of simplicity data processing system 100 will therefore be referred to as client system 100 and data processing system 100' will be referred to as server 100'. Importantly, although FIG. 1 shows client 100 and server 100' to be substantially similar systems, the present invention is specifically directed at heterogeneous computer networks which include dissimilar clients and servers. It should also be noted that the present invention is equally applicable to peer-to-peer networks where each system can simultaneously act as a client or server.

The present invention is probably best understood by brief reference to FIG. 2 where a parameter list is shown and generally designated 200. Parameter list 200 has three entries, namely a parameter 'x' 202a, a parameter 'y' 202b and a parameter 'z' 202c. For purposes of illustration, it may be assumed that parameter list 200 is the parameter list that would be generated by client 100 to perform an object call of the form: add (x, y, z). It is important to note, however, that the ordering of the parameters 202 within the parameter list 200 is system dependent. As a result, not all systems types will arrange the parameters 202 in the order shown. For example, on another type of system, the parameter list 200 could just as easily correspond to an object call of the form: add(z, y, x).

In general terms, the present invention provides a methodology for passing parameter lists, such as parameter list 200, between systems, such as client 100 and server 100' in such a way that the parameters 202 are correctly arranged for both client 100 and server 100'. This method may be understood by simultaneous reference to FIG. 3, where the method is shown as a flowchart, and FIGS. 4 through 6 where various data structures relating to the method are illustrated. In FIG. 3, it may be seen that the method for processing an object call, generally designated 300, begins on client system 100 with step 302 where a first parameterized vector is allocated. For the present invention a parameterized vector is an array, or other data structure, which has one entry for each parameter in an associated object call. In FIG. 4, the first parameterized vector 400 is shown to include three entries, 402a, 402b and 402c corresponding to the three parameters 202 in parameter list 200. Various techniques exist for the actual allocation of parameterized vector 400. In general, any of these techniques which is compatible with re-entrant programming methodologies may be utilized in step 302.

In the following step, step 304, the first parameterized vector 400 is initialized. As shown in FIG. 4, each entry 402 in first parameterized vector 400 is initialized to be a pointer which points to one of the parameters 202 in the parameter list 200. Importantly, the entries 402 within the parameterized vector 400 are arranged in a predetermined canonical order. In general, any consistent predetermined ordering may be chosen as the canonical order of parameterized vector 400. For convenience, however, it is generally preferable to use the order with which the parameters appear in the declaration of the object call as the canonical ordering. Importantly, the canonical ordering must be the same for all systems on a single network. Therefore, the canonical ordering used by client 100 and server 100' must be equivalent.

In step 306, the client system 100 transmits the object call to the server system 100'. While a discussion of the details involved in the transmission of the object call is beyond the scope of this application, it is important to note that the transmission of step 306 includes transmission of the first parameterized vector 400 as well as each object (i.e. each parameter) pointed to by the entries 402 within the first parameterized vector 400.

Execution of the method 300 resumes on the server system 100' in step 308 where the object call is received by the server system 100'. In the following step, step 310, a parameter area is allocated by the server system 100'. As seen in FIG. 5, the parameter area 500 includes one entry 502a, 502b and 502c for each parameter associated with the object call. The entries 502 within the parameter area are arranged in the correct order for an object call on the server system 100' For purposes of illustration, it may be seen that the parameter order of system 100' is shown as being reversed from the order shown in FIG. 2 for client system 100.

In step 312 the parameter area 500 is initialized. This initialization is carried out by creating a mapping which associates each entry 502 in the parameter area 500 with an entry 402 in the first parameterized vector 400. The mapping is a one-to-one correspondence between the canonical ordering in parameterized vector 400 and the parameter order required for the server system 100'. In FIG. 5, this mapping is represented by associations 504a, 504b and 504c. Once the correct mapping has been determined, each entry 502 in the parameter area 500 is initialized to contain an object pointed to (i.e. a parameter) by the corresponding entry 402 in the parameterized vector 400. In this fashion, the parameter area becomes a new parameter list, arranged in the correct parameter order for the server system 100'.

In the following step 314, the server system 100' calls the actual object call requested by the client system 100'. The object call uses the parameter area 500 as its parameters. In step 316, which follows the actual object call of step 314, a second parameterized vector 600 is allocated. As shown in FIG. 6, second parameterized vector 600 is generally similar to first parameterized vector 400 and includes one entry, 602a, 602b and 602c, for each parameter in the parameter area 500. Like first parameterized vector 400, second parameterized vector 600 is arranged in canonical order.

In step 318, the second parameterized vector 600 is initialized. In the case of second parameterized vector 600, each entry 602 is initialized to point at the associated parameter 502 in the parameter area 500. The second parameterized vector 600, in effect, mimics the first parameterized vector 400 except that the second parameterized vector 600 points to the parameters 502 after the execution of the object call. In some cases, of course, these parameters 502 will have been modified during execution of the object call.

The final step executed by the server system 100', shown in step 320, is to transmit the return of the object call to the client system 100. The transmission of the return includes the second parameterized vector 600 and the parameter area 500 and is received by the client system 100 in step 322.

After receipt of the object call return in step 322, the client system 100 is effectively in possession of two sets of parameters, each associated with the object call. The first set, pointed to by the entries 402 in the first parameterized vector 400, are the parameters which the client system 100 had originally passed to the server system. The second set of parameters are the entries 502 in the parameter area 500 which are pointed to by the entries 602 in the second parameterized vector 600. Since the second set of parameters may have been changed by the object call, it is required that each of the original parameters be updated with the corresponding parameter 502 in the parameter area 500. This can be accomplished by overwriting the parameter pointed to by each entry 402 in the first parameterized vector 400 with the parameter 502 pointed to by the equivalent entry 602 in the second parameterized vector 600.

In some cases, the server process and the client process will actually be part of a single larger process. In these cases, the overhead of actually moving parameters may be avoided by having the entries 402 in the first parameterized vector 400 and the entries 602 in the second parameterized vector 600 point to the original parameters passed to the object call.

The present invention specifically includes an apparatus designed to perform the steps required by FIG. 3. This apparatus is shown symbolically in FIG. 1 as client routines 116 and server routines 118. More specifically, it may be assumed that the client routines 116 are computer executable codes which implement the steps 302–306 as well as 322 and 324 of FIG. 3. It may also be assumed that server routines 116' are computer executable codes which implement the steps 308 through 320 of FIG. 3.

The present invention further incorporates an article of manufacture, which is a computer readable medium such as a floppy disk, optical disk, or hard drive, etc., storing instructions of a type executable by a CPU to perform the steps of FIG. 3.

The object call methodology 300, described in the preceding paragraphs may be implemented by manually creating compatible object call interfaces on the client system 100 and server system 100'. Preferably, however, the implementation of the methodology is at least partially implemented as part of an IDL compilation system, such as the IDL compilation system 700 shown in FIG. 7. As shown in FIG. 7, IDL compilation system 700 starts with an IDL description file. This file is a source file which contains constructs similar to declarations found in high-level language programming. The declarations define interfaces between the client system 100 and the server system 100' in terms of objects.

The IDL source file is processed by an IDL compiler 704 which outputs an intermediate representation of the IDL description. The intermediate representation is passed separately to a client code generator 706 and a server code generator 708. The two code generators, 706 and 708, output source files 710 and 712 respectively, this time written in a high-level language, suitable for compilation on the client system 100, or server system 100'.

The source file 710 output by the client code generator 706 contains a definition, written in a high-level language, of a client stub procedure for each object call defined in the IDL description file 702. Similarly, the source file 712 output by the server code generator 708 contains a definition, written in a high-level language, of a server skeleton procedure for each object call defined in the IDL description file 702. Additionally, source files 710 and 712 each include a compact version of each IDL-defined data type. This compact version, termed "CIN", is a representation of an IDL data structure utilizing a special notation. The creation of CIN by the code generators 706, 708 is described in detail in a co-pending, commonly assigned application entitled "Compact IDL Notation" by Andrew Schofield, the disclosure of which is incorporated herein by reference.

Each client stub procedure and server skeleton procedure function as entry points for the associated object call. When the client system 100' wishes to perform an object call, it calls the associated client stub procedure, passing each parameter it wishes to have passed during the object call. The client stub procedure performs the tasks of allocating and initializing the first parameterized vector 400 as well as transmitting the object call to the server 100' (steps 302 through 306 of FIG. 3). When the object call returns, the client stub procedure performs the tasks of receiving the object call return and updating the parameters of the object call (steps 322 and 324 of FIG. 3). In other words, the client stub procedure performs each task required by the client 100 during the object call, effectively hiding the details of the object call, and the use of the parameterized vectors 400 and 600, from the remainder of the client system 100.

In a similar fashion, the server skeleton procedure performs each task required of the server system 100' (namely steps 308 through 320 of FIG. 3) after the server 100' has received the object call. These tasks and the use of the parameterized vectors 400 and 600 are isolated from the remainder of the server system 100'.

The client source file 710 is compiled and linked with client applications 714 and the server source file 712 is compiled and linked with server applications 716. In this fashion, the IDL compilation system provides a compatible object call interface between client 100 and server 100' which includes the use of parameterized vectors 400 and 600.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A parameterized vector for use in an object call between a client and a server, said client requiring said object call to have a first parameter order and said server requiring said object call to have a second parameter order, said parameterized vector comprised of a plurality of entries, each entry in the plurality of entries a pointer to a parameter for said object call, said plurality of entries arranged in a canonical order, said canonical order being independent of said first and said second parameter orders.

2. The parameterized vector of claim 1, wherein an interface definition language source file is created in accordance with the parameterized vector.

3. The parameterized vector of claim 2, wherein a client source code for a client stub procedure is created from the interface definition language source file.

4. The parameterized vector of claim 2, wherein a server skeleton code for a server skeleton stub is created from the interface definition language source file.

5. A method of providing the source code for use in an object call between a client and a server, the client requiring the object call to have a first parameter order and the server requiring the object call to have a second parameter order, the method comprising:

defining a parameterized vector for use in an object call, the parameterized vector comprised of a plurality of entries, each entry in the plurality of entries a pointer to a parameter for the object call, the plurality of entries arranged in a canonical order the canonical order being independent of the first and the second parameter orders;

using the parameterized vector to generate an interface definition language source file; and using the interface definition language source file to generate the source code for a client stub procedure and a server skeleton procedure.

6. The method of claim 5, further comprising compiling the client stub procedure for execution on a client computer and compiling the server skeleton procedure for execution on the server computer system.

7. The method of claim 6, further comprising invoking the object call using compiled client stub procedure, the invoking including attaching the parameterized vector to data sent to compiled server skeleton procedure.

8. A computer readable medium tangibly embodying a program of instructions implementing:

a parameterized vector for use in an object call between a client and a server, the client requiring the object call to have a first parameter order and the server requiring the object call to have a second parameter order, the parameterized vector comprised of a plurality of entries, each entry in the plurality of entries a pointer to a parameter for the object call, he plurality of entries arranged in a canonical order, the canonical order being independent of the first and the second parameter orders.

9. The computer readable medium as in claim 8, wherein said program of instructions further includes instructions implementing using the parameterized vector to generate an interface definition language source file.

10. The computer readable medium as in claim 9, wherein said program of instructions further includes instructions implementing using the interface definition language source file to generate source code for a client stub procedure and a server skeleton procedure.

11. A client/server system comprising:

a server having a processor configured for use with a first set of protocols;

a client having a processor configured for use with a second set of protocols;

memory operably associated with said server and said client;

a program of instructions, capable of being stored in said memory and executed by at least one of said client and said server, said program of instructions implementing a parameterized vector for use in an object call between said client and said server, the parameterized vector comprised of a plurality of entries, each entry in the plurality of entries a pointer to a parameter for the object call, the plurality of entries arranged in a canonical order, the canonical order being independent of said first and said second set of protocols.

* * * * *